Jan. 23, 1962 V. E. ACKLES 3,017,986
CONVEYOR WASHING MECHANISM
Filed March 10, 1961 3 Sheets-Sheet 1
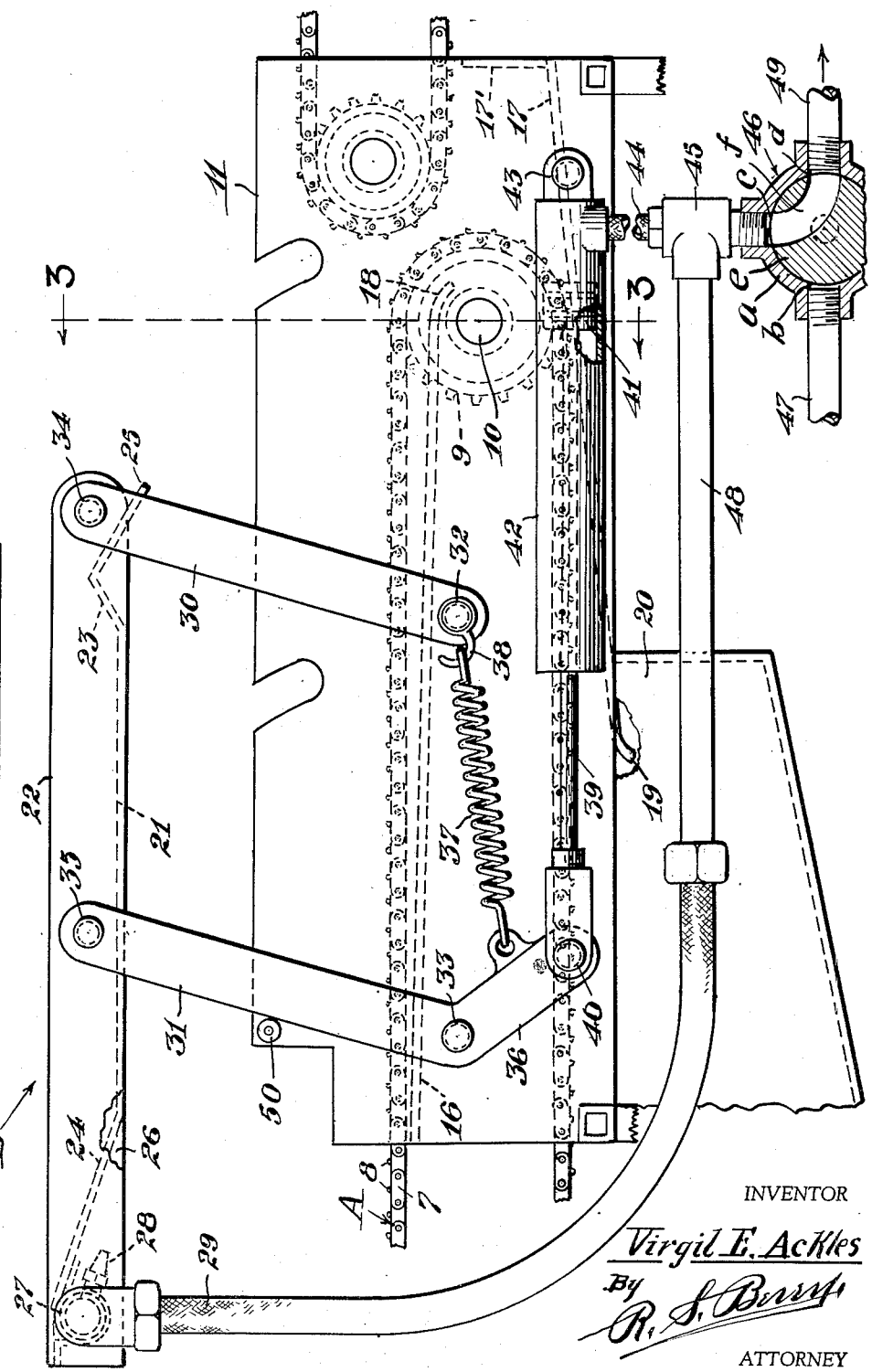
INVENTOR
Virgil E. Ackles
By
R. S. Berry
ATTORNEY

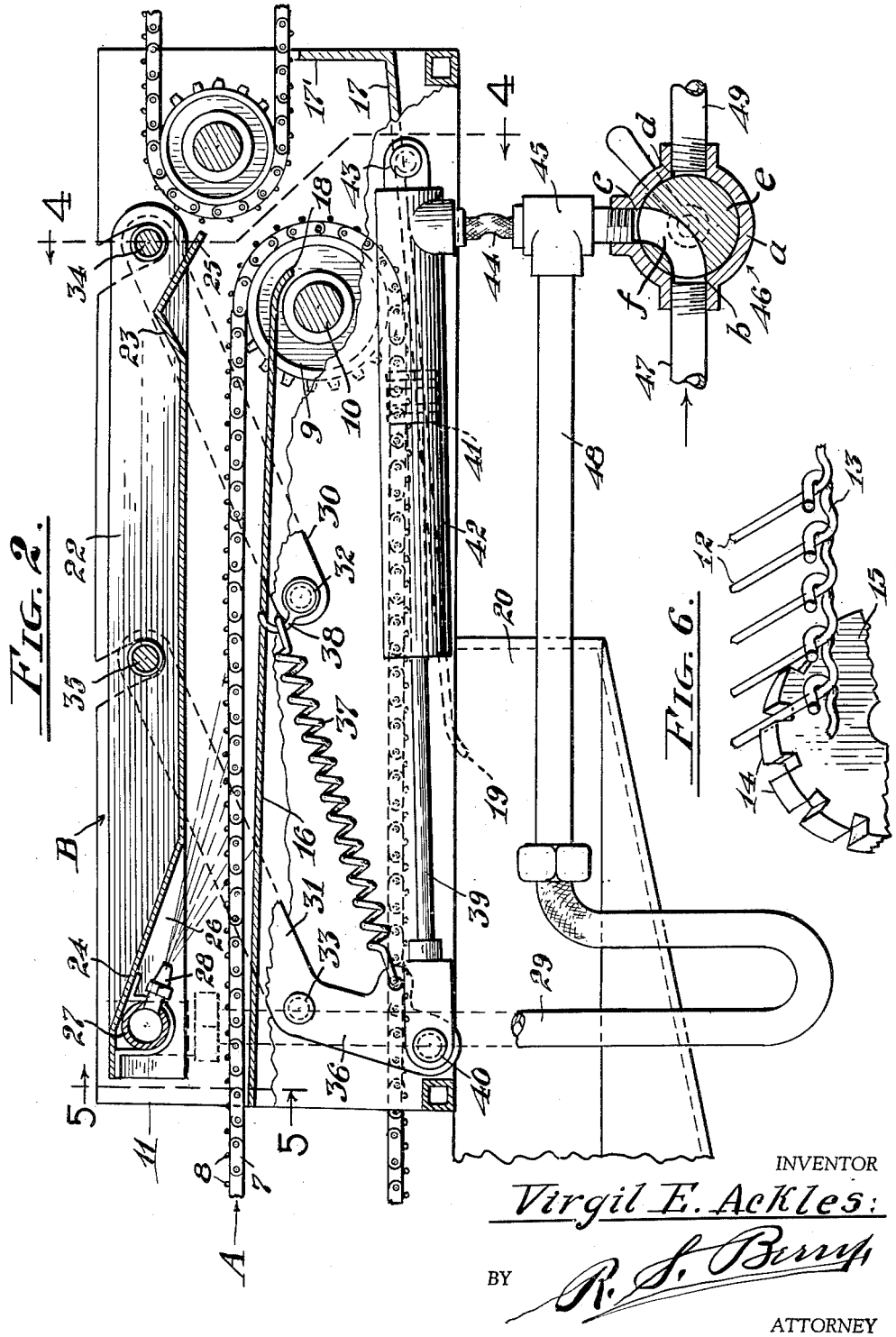

Jan. 23, 1962   V. E. ACKLES   3,017,986
CONVEYOR WASHING MECHANISM
Filed March 10, 1961   3 Sheets-Sheet 3
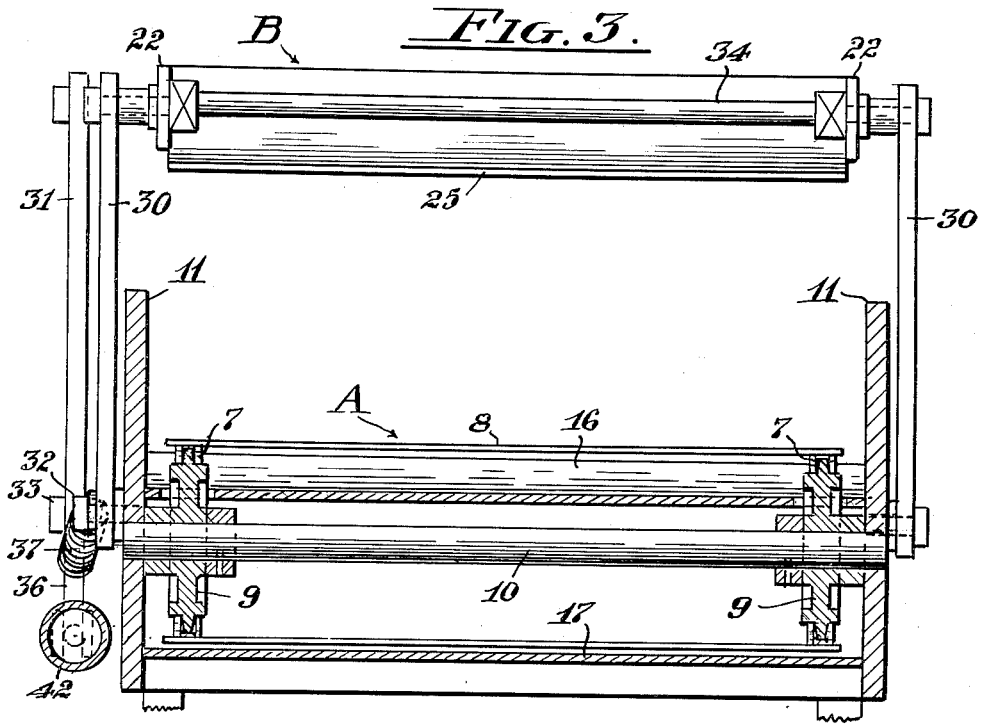
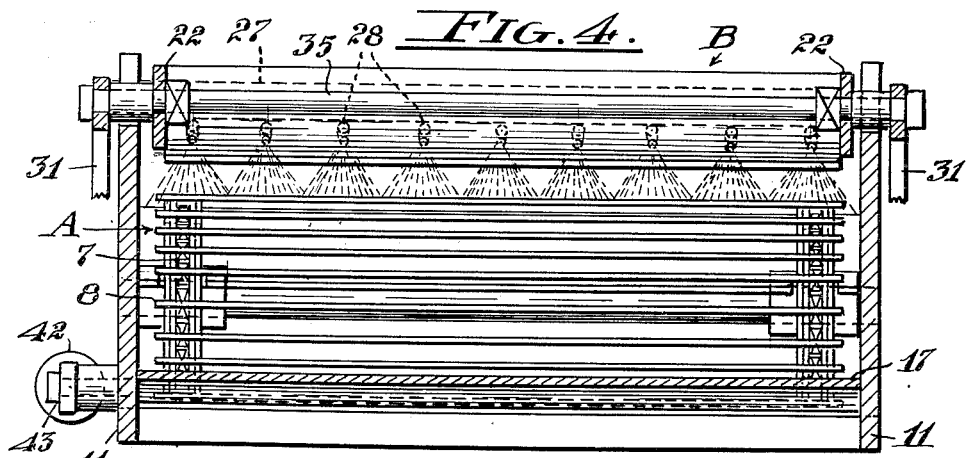
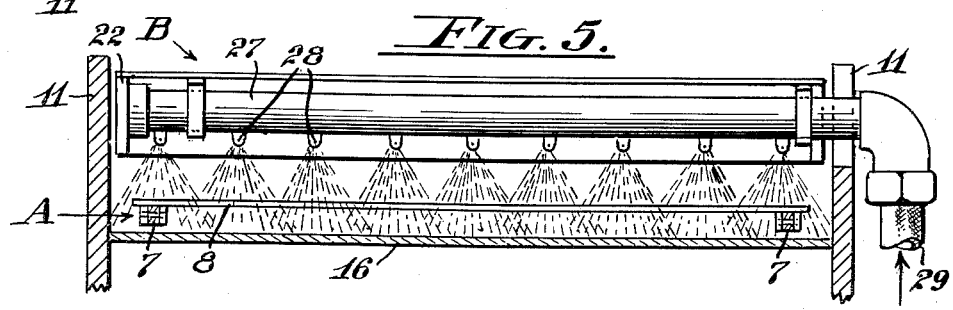

ic Office 3,017,986
Patented Jan. 23, 1962

3,017,986
CONVEYOR WASHING MECHANISM
Virgil E. Ackles, 841 E. 4th St., Los Angeles, Calif.
Filed Mar. 10, 1961, Ser. No. 94,837
9 Claims. (Cl. 198—230)

This invention relates to a mechanism for cleansing horizontal conveyors of the type employed in the manufacture of doughnuts and similar food products.

The primary object of the invention is to provide an attachment for conveyors of the above stated type whereby the conveyor may be washed by forceful jets of cleansing liquid directed from an overlying sprayer while the conveyor is in motion.

A particular object is to provide a construction in the attachment whereby the sprayer may be automatically swung upward and held in an elevated inoperative position, and embodying valve controlled means whereby on directly cleansing liquid to the sprayer the latter will be automatically lowered to an operative position.

Another object is to provide an arrangement whereby moving of the conveyor sprayer to its lowered operative position and its retention in such position will be effected under the urge of pressure imparted to the cleansing liquid during the cleansing operation and on terminating the flow of the cleansing liquid, such pressure will be relieved so that the sprayer will then move to its elevated out-of-way postion, and whereby the discharge of cleansing liquid will occur only when the sprayer is in its lowered operative position.

A particular advantage of the invention lies in its being adapted to be permanently mounted relative to a horizontal conveyor and operated to dispose a sprayer in close proximity to the conveyor during the cleansing operation, and to elevate the sprayer to an out-of-the-way position when not in use, coupled with obviating the hazard incident to accidental discharge of hot cleansing liquid when the sprayer is in its elevated position.

With the foregoing objects in view together with such other objects and advantages as may subsequently appear, the invention resides in the parts and in the combination, construction and arrangement of parts hereinafter described and claimed and as illustrated by way of example in the accompanying drawings in which:

FIG. 1 is a view in side elevation of the conveyor cleansing attachment showing it as applied and with the sprayer in its elevated inoperative position; parts being broken away and parts shown in section;

FIG. 2 is a view of the attachment as seen in longitudinal section partly in elevation showing it as applied with the sprayer disposed in its lowered operative position;

FIG. 3 is a view in cross section and elevation as seen on the line 3—3 of FIG. 1;

FIG. 4 is a view in cross section and elevation as seen on the line 4—4 of FIG. 2 in the direction indicated by the arrows;

FIG. 5 is a view in section and elevation as seen on the line 5—5 of FIG. 2 in the direction indicated by the arrows; and FIG. 6 is an isometric view of a fragmentary portion of a chain conveyor and its sprocket wherein the conveyor comprises a series of spaced parallel interlinked transverse rods.

Referring to the drawings more specifically A indicates generally a horizontal conveyor of the type commonly employed in conveying doughnuts and other pastry products in the course of their manufacture and which conveyor is here shown in FIGS. 1 to 5 inclusive as comprising a pair of conventional sprocket chains 7—7 having transverse rods or bars 8 affixed on the links thereof.

The chains 7—7 are carried on sprocket wheels 9—9 on shafts 10 journalled on spaced parallel side plates 11—11 embodied in a supporting frame and extending along and contiguous to opposite sides of the conveyor which is thus mounted and driven in a usual manner. However the conveyor may comprise the type depicted in FIG. 6 wherein the conveyor consists of a series of parallel rods 12 having the end portions of adjacent rods flexibly interconnected by integral links 13, the rods 12 being engaged directly by the teeth 14 of a sprocket wheel 15.

In carrying out the invention a pair of superimposed drainage trays 16—17 are provided of which the uppermost tray 16 underlies the upper run of the conveyor A adjacent thereto. The tray 16 extends horizontally between the side plates 11—11 and inclines downward long'tudinally from a point spaced inwardly from the forward end of the conveyor and terminates in a downturned lower end portion 18 overlying the shaft 10. The lower tray 17 underlies the lower run of the conveyor A adjacent thereto and extends horizontally between the side plates 11—11; the tray inclining longitudinally downward and rearward from its forward end. The upper forward end portion of the tray 17 underlies the downturned end 18 of the upper tray 16 to receive drainage therefrom and has its lower end 19 terminating beneath the intermediate portion of the tray 16 and directed into a hopper 20 leading to a suitable point of discharge, not shown. The forward end of the tray 17 has an upstanding wall 17' extending continuously between its side margins for preventing flow of liquid from the front end margin of the tray.

The trays 16—17 are rigidly affixed along their side margins to the inner sides of the panels 11—11 in any conventional manner.

The essence of the invention resides in the provision of a sprayer B mouted for vertical swinging movement above the conveyor A between a lowered operative position adjacent the upper run of the conveyor and an elevated inoperative position spaced substantially above the conveyor. The sprayer B embodies a horizontal panel 21 having upstanding side flanges 22—22 which panel has a width slightly less than the distance between the side panels 11—11 and has a length approximating that of the upper drainage tray 16.

The panel 21 is flat throughout the intermediate portion thereof and has upwardly inclined front and rear wall portions 23 and 24 flanked at their side margins by continuations of the side flanges 22—22; the front wall portion 23 terminating in a downwardly inclined wall 25 the end edge portion of which projects slightly below the plane of the underside of the panel 21.

A downwardly opening chamber 26 is provided beneath the inclined rear wall portion 24 and extending between the side flanges 22—22 and mounted in the chamber 26 and extending transversely beneath and across the wall portion 24 is a tubular manifold 27 constituting a sprinkler head, which manifold is fitted with a series of suitably spaced downwardly and forwardly inclined discharge nozzles 28 arranged to project jets of cleansing liquid forwardly and downwardly from beneath the inclined end wall 24.

One end of the manifold 27 is closed while its other end extends through one of the side flanges 22 and is connected to a flexible conduit 29 connected with a source of cleansing liquid supply as will be later described.

The sprayer B is carried on the upper ends of front and rear pairs of rocker arms 30—30 and 31—31 mounted to swing vertically on pivots 32—32 and 33—33 respectively projecting in horizontal alignment from the outer faces of the panels 11—11. The front pair of arms 30—30 are connected at their upper ends to a shaft 34 pivotally supported on the forward ends of the side flanges 22—22, while the upper ends of the rear pair of arms 31—31 are connected to a shaft 35 pivotally supported on the flanges 22—22 intermediate their ends. The pivots 32—32 are spaced from the pivots 33—33 a distance corresponding to the distance between the pivotal connections between the shafts 34 and 35 and the pivots 32—32 are spaced from the pivotal mounting of the shaft 34 a distance corresponding to the distance between the pivots 33—33 and the pivotal mountings of the shaft 35 so that the pairs of rocker arms will move in parallel relation to each other whereby the panel 21 of the sprayer B will be maintained horizontal in any position in its path of travel within the range of movement of the pairs of rocker arms.

The rear rocker arms 31—31 each have an end extension 36 projecting below its pivot 33 to which is connected one end of a pull spring 37 extending forwardly of the extension 36 and having its other end attached to a fixed bracket 38 here shown as mounted on the pivot 32; the springs 37 exerting a pull on the arm extensions 36 such as to swing the rocker arms 31 upward and thus normally dispose the sprayer B in an elevated position as shown in FIG. 1.

Fluid pressure actuated means is provided for swinging the pairs of rocker arms downward in opposition to the springs 37, which means embodies a horizontally extending piston rod 39 one end of which is attached by a pivot 40 to the lower end of one of the arm extensions 36 and the other end of which is fitted with a piston 41 mounted to slide in a tubular cylinder 42 having an open outer end into which the piston rod 39 extends.

The cylinder 42 has a closed inner end attached by a pivot 43 to the adjacent side plate 11 for vertical swinging movement. A flexible conduit 44 connects with the inner end of the cylinder 42 and opens to the interior thereof rearward of the piston 41. The conduit 44 leads downward to a coupling 45 connecting through a control valve 46 with a conduit 47 leading from a source of cleaning liquid supply under pressure. The valve 46 is disposed on a plane below that of the coupling 45.

Leading from the coupling 45 is a conduit 48 which connects with the flexible conduit 29 leading upward and attached to the manifold 27.

The valve 46 is a three-way valve embodying a housing *a* having an inlet port *b* with which the supply conduit 47 connects, and having two outlet ports *c* and *d* of which the port *c* connects with the coupling 45 and the port *d* connects with a drain pipe 49 leading to any suitable point of discharge.

Turnably mounted in the housing *a* is a cylindrical valve element *e* having a transverse passage *f* arranged to afford a communication between the ports *b* and *c* when the element *e* is in one position as shown in FIG. 2, or to afford communication between the ports *c* and *d* when the element *e* is in another position, as shown in FIG. 1.

In the operation of the invention, when the element *e* of the valve 46 is disposed with the passage *f* thereof connecting the ports *c* and *d* as shown in FIG. 1, any liquid as may be present in the manifold 27, conduits 29 and 48, cylinder 42, conduit 44 and coupling 45 will gravitate to discharge through the drain pipe 49, thereby relieving liquid pressure behind the piston 41 so that the tensioned springs 37 will act to swing the rocker arms 31—31 from the lowered position shown in FIG. 2 to their upstanding position shown in FIG. 1. The upper ends of the arms 31—31 in moving upward carry the sprayer B therewith which in moving upward cause the front arms 30—30 to swing upward in parallel relation to the rear rocker arms 31—31; the arms 30—30 acting as drag-links to maintain the tray-like body of the sprayer in a horizontal position. Any suitable means may be employed to limit upward movement of the sprayer but a cushioned stop 50 is here shown as mounted on one of the side plates 11—11 for this purpose; the stop 50 extending into the path of travel of the outer end portion of one of the rocker arms 31—31 and serving as an abutment limiting upward and rearward movement of the arms 31—31 and the sprayer carried thereby. When the sprayer B is in its elevated position and the parts disposed as above described and as shown in FIG. 1, that is with the valve 46 closed to the supply conduit 47, no liquid can flow from the source of supply to the discharge nozzles 28 and accordingly the sprayer will then be maintained inoperative until the valve 46 is opened to the supply conduit 47 and during which time the conveyor A may be operated for the purpose for which it is intended.

When it is desired to subject the conveyor A to a cleansing action it is cleared of products being conveyed thereby and the valve 46 is manually actuated in a usual manner to position the element *e* thereof with the passage *f* connecting the ports *b* and *c* as shown in FIG. 2, whereupon cleansing liquid will be directed from the supply conduit 47 through the valve 46 and will flow in most part to the manifold 27 and be discharged through the nozzles 28, while a portion of liquid will be delivered simultaneously through the conduit 44 into the cylinder 42 rearward of the piston 41.

The upward flow of the liquid to the manifold 27 and the resistance offered to discharge of the liquid through jet orifices of the nozzles 28 sets up sufficient back pressure to cause the liquid delivered to the cylinder 42 to advance the piston 41 and thereby act through the rod 39 and arm extension 36 to swing the arms 31—31 forward and downward in opposition to the springs 37. The upper ends of the arms 31—31 in moving downward carry the sprayer B therewith which causes the arms 30—30 to swing forward and down until the sprayer B is brought to rest in its lowered position in which the panel 21 is disposed adjacent to but spaced a short distance above the upper run of the conveyor A as shown in FIG. 2. This downward movement of the sprayer may be limited in any desired manner but is here shown as arrested by the outer end portions of the shafts 34 and 35 abutting against upper marginal portions of the side plates 11.

The sprayer will then be maintained in its lowered position by the pressure of the cleansing liquid imposed on the piston 41 holding the latter in its outer position while the valve 46 is open to the supply conduit 47. When the valve is so disposed, cleansing liquid will be discharged from the nozzles 28 and will be directed thereby obliquely onto the upper run of the conveyor, which is caused to travel beneath the sprayer, thereby effecting a cleansing action on the conveyor. The nozzles 28 are arranged along the length of the manifold 29 in such numbers and in such proximity to each other as to direct jets of the cleansing liquid onto the conveyor parts and into the spaces therebetween. Portions of the jets impinge on the drainage tray 16 at an angle and are thereby deflected upwardly against the under sides of parts of the conveyor. By thus forceably projecting jets of hot cleansing liquid onto the conveyor a rapid and thorough cleansing action is effected.

The liquid discharging from the nozzles is initially confined to the space bounded by the tray 16, panel 21 and the side plates 11—11 and is caught in most part on the tray 16 and delivered from the lower forward end thereof onto the lower tray 17 from which the liquid flows to the hopper 20 and to discharge therefrom.

By housing the sprinkler head within the chamber 26 beneath the inclined end wall 24, upwardly directed liquid spraying from the nozzles 28 will be deflected downwardly by said wall, and liquid sprayed laterally outward from the end nozzles will be deflected by the portions of the flanges 22—22 forming the ends of the chamber 26, thus confining the spraying liquid to the space beneath the sprinkler panel 21. By the provision of the downwardly inclined forward end wall 25 sprays of liquid deflected upwardly from the drainage tray 16 will be prevented from escaping upwardly from the forward end of the sprinkler and will be directed downwardly onto the lower tray 17 the forward end wall 17' of which serves to prevent such liquid from escaping from the front end of the tray.

The cleansing liquid comprises any suitable detergent which is heated in any desired manner and delivered to the conduit 47 under any suitable pressure.

When it is desired to terminate the spraying action the element $e$ of the valve 46 is turned to dispose the passage $f$ out of communication with the ports $b$ and $c$ and into communication with the ports $c$ and $d$ thereby shutting off the supply of cleansing liquid to the sprinkler head and permitting the liquid in the passages in the sprayer system to flow to discharge whereupon the springs 37 will act to elevate the sprayer B as before described.

From the foregoing it will be seen that I have provided an effective means for cleansing horizontal conveyors in accordance with the objects and advantages hereinbefore set forth, but while I have shown and described a specific embodiment of the invention the particular construction and arrangement of the parts is subject to modification and accordingly the invention embraces any such modifications as come within the meaning and scope of the appended claims.

I claim:

1. In a mechanism for washing horizontal conveyors, a sprayer extending over the conveyor, means for supporting said sprayer for downward movement toward said conveyor and for upward movement away therefrom, valve controlled means for delivering cleansing liquid to said sprayer under pressure, mechanism operable by pressure of the cleansing liquid being delivered to said sprayer to move said sprayer to a lowered position proximate the conveyor and to retain it in such position, and automatic means for moving the sprayer upward to an elevated position relative to the conveyor and holding it in such position on termination of the delivery of the liquid to said sprayer.

2. The structure called for in claim 1 in which said sprayer embodies an elongated horizontal panel arranged to overlie the conveyor in spaced but close proximity thereto when said sprayer is in its lowered position, and a sprinkler head attached to an end portion of said panel with which said liquid delivering means connects, said sprinkler head embodying a row of discharge nozzles arranged to direct jets of liquid onto said conveyor beneath said panel.

3. The structure called for in claim 1 in which said sprayer embodies an elongated horizontal panel arranged to overlie the conveyor in spaced but close proximity thereto when said sprayer is in its lowered position, a sprinkler head attached to an end portion of said panel with which said liquid delivering means connects, said sprinkler head embodying a row of discharge nozzles arranged to direct jets of liquid onto said conveyor beneath said panel, and a drainage tray arranged beneath the conveyor extending opposite said panel arranged to deflect jets discharged from said nozzle upwardly against the underside of said conveyor.

4. In a mechanism for washing horizontal conveyors, a sprayer extending over said conveyor embodying a sprinkler head having a series of nozzles arranged to direct jets of cleansing liquid onto said conveyor, pairs of rocker arms connected at their outer ends to said sprinkler, pivotal supports therefor, spring means acting on certain of said arms to swing the arm and said sprayer upwardly to dispose and yieldably hold said sprayer in an elevated position relative to the conveyor, valve controlled means for delivering cleansing liquid under pressure to said sprinkler head, mechanism operable by pressure of the cleansing liquid being delivered to said sprinkler head to swing said rocker-arms downwardly to move said sprayer to a lowered position proximate the conveyor and to retain it in such position while the liquid is being delivered to said sprinkler head.

5. The structure called for in claim 4 in which said mechanism embodies a cylinder having a piston therein connected to one of said rocker arms, a valve having an inlet connected to a source of liquid supply under pressure, a conduit leading from said valve to said sprinkler head, and a conduit leading from said valve to said cylinder, said valve being adapted to either direct liquid from the source of supply collectively to said conduits, or to open said conduits to discharge.

6. The structure called for in claim 4 in which said sprayer embodies an elongated horizontal panel arranged to overlie said conveyor in spaced but close proximity thereto when said sprayer is in its lowered position, and said nozzles are arranged to direct the jets discharged therefrom obliquely beneath said panel.

7. In a mechanism for washing conveyors having a horizontally extending upper run, opposed fixed parallel upstanding panels at the side margins of said run, a fixed drainage tray extending between said panels beneath and contiguous said run, a sprayer embodying a horizontal panel overlying said run above said tray and including a sprinkler head fixed on said panel having a row of nozzles arranged to project jets of cleansing liquid obliquely downward onto said run and against said tray whereby portions of the liquid will be deflected by said tray and panel against opposite sides of said run, means supporting said sprayer for movement toward and away from said conveyor run, means normally holding said sprayer on its supporting means in an elevated position relative to said conveyor, valve controlled means for delivering cleansing liquid to said sprinkler head, and fluid pressure actuated means for lowering said sprayer relative to said conveyor.

8. In a mechanism for washing horizontal conveyors, a liquid sprayer arranged above the conveyor, supporting means for said sprayer moveable to raise or lower said sprayer relative to the conveyor, yieldable means acting on said supporting means normally disposing said sprayer in an elevated position, fluid pressure actuated means acting on said supporting means for disposing said sprayer in a lowered position, and means for directing cleansing liquid under pressure simultaneously to said sprayer and said fluid pressure actuated means.

9. The structure called for in claim 8 wherein said last named means comprises a valve having an intake connected to a source of cleansing liquid under pressure and having an outlet connected to both said sprinkler and said fluid pressure actuated means, said valve including an element positionable to direct liquid from said source collectively to said sprayer and fluid pressure actuated means and operable to close said intake and effect exhaust of liquid from said sprayer and fluid pressure actuated means.

No references cited.